United States Patent
Mui et al.

(10) Patent No.: US 8,786,914 B1
(45) Date of Patent: Jul. 22, 2014

(54) SCANNER

(71) Applicant: Hewlett-Packard Development Company, L.P., Houston, TX (US)

(72) Inventors: Paul K. Mui, Boise, ID (US); Dean J. Richtsmeier, Boise, ID (US); Jeffrey D. Rutland, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/776,981

(22) Filed: Feb. 26, 2013

(51) Int. Cl.
*H04N 1/04* (2006.01)
*H04N 1/10* (2006.01)

(52) U.S. Cl.
CPC .................................. *H04N 1/1013* (2013.01)
USPC ............ 358/474; 358/461; 358/498; 358/497

(58) Field of Classification Search
USPC .................... 358/474, 461, 498, 497
See application file for complete search history.

(56) References Cited

U.S. PATENT DOCUMENTS

| | | | |
|---|---|---|---|
| 6,947,187 B2 | 9/2005 | Mui et al. | |
| 7,812,999 B2 | 10/2010 | Motamed | |
| 8,064,105 B2 * | 11/2011 | Murakami et al. | 358/461 |
| 8,253,991 B2 * | 8/2012 | Wang et al. | 358/474 |
| 2008/0030807 A1 | 2/2008 | Chen | |
| 2009/0168116 A1 | 7/2009 | Cui | |
| 2012/0133995 A1 | 5/2012 | Chun et al. | |

FOREIGN PATENT DOCUMENTS

JP   2002-290685   * 10/2002   ............... H04N 1/19

OTHER PUBLICATIONS

Ostromoukhov, V. et al., Two Approaches in Scanner-printer Calibration: Colorimetric Space-based Vs."Closed-Loop", (Research Paper), International Symposium on Electronic Imaging: Science & Technology, Feb. 6-10, 1994, pp. 133-142, vol. 2170.

* cited by examiner

*Primary Examiner* — Houshang Safaipour
(74) *Attorney, Agent, or Firm* — Steven L. Webb

(57) ABSTRACT

A scanner is disclosed. The scanner has only one calibration strip.

14 Claims, 7 Drawing Sheets

SCANNER

BACKGROUND

Scanners are used to create digital copies of documents or images. There are many types of scanners, for example sheet feed scanners, flatbed scanners, stand alone scanners and scanners integrated into multifiunctional printers (MFPs). Almost all scanners calibrate the scanning sensor using a calibration strip to improve the image quality of the scan.

DETAILED DESCRIPTION

Duplex scanners, scanners that can scan both sides of a page, are becoming more common. Many duplex scanners only have one scan sensor. These types of duplex scanners rely on an automatic document feeder (ADF) that moves the page past the scan sensor with a first side of the page facing the scan sensor. The ADF then moves the page past the scan sensor a second time with the other side of the page facing the scan sensor. Newer duplex scanners have two scan sensors. In such scanners as the paper is moved past the scan sensors by the ADF, one of the scan sensors scans the first side of the page and the other scan sensor scans the other side of the page.

When the duplex scanner is only a sheet feed scanner, both scan sensors are typically fixed in place. Some duplex scanners also have a flatbed scanning area. Typically the flatbed scanning area is a transparent platen where the user can place items to be scanned. One of the two scan sensors moves underneath the platen to scan items placed on the platen. The other scan sensor is typically fixed in place.

A scanner with two scan sensors typically has two different calibration strips, one for each scan sensor. A first calibration strip is located underneath the ADF step glass below the fixed scan sensor. The second calibration strip is typically positioned on top of the flatbed scanning platen underneath the front bezel. Having two calibration strips is costly. In one example a duplex scanner with only one calibration strip is provided.

Figure 1:
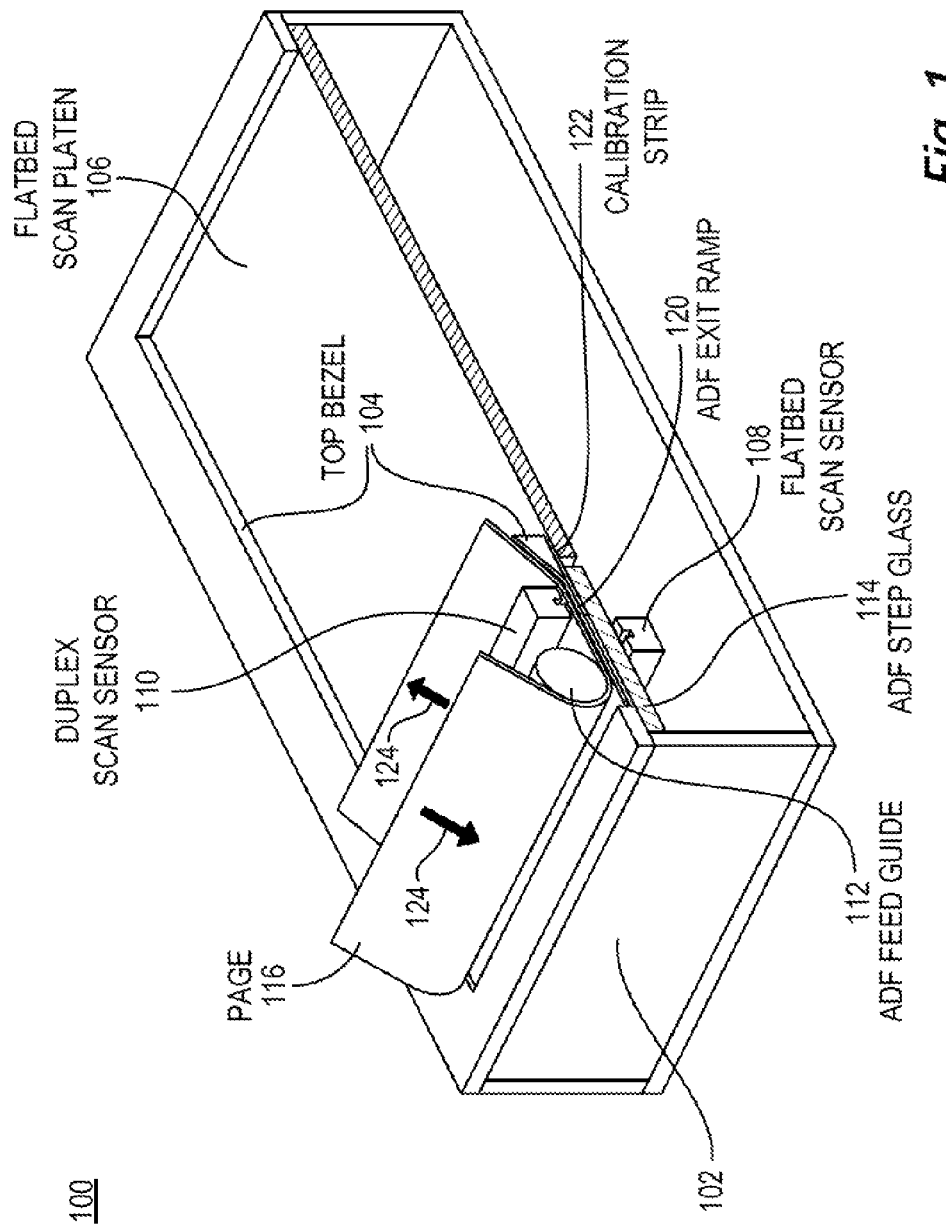
FIG. 1 is a cutaway isometric view of an example duplex scanner.

FIG. 1 is a cutaway isometric view of an example duplex scanner. Scanner 100 comprises a scanner base 102, a top bezel 104, a flatbed scan platen 106, a flatbed scan sensor 108, an automatic document feeder (ADF) exit ramp 120, an ADF step glass 114 and a single calibration strip 122. Scanner base 102 is generally a hollow rectangular box that supports the flatbed scan platen 106 and the ADF step glass 114 around their edges. Top bezel 104 which fits on top of the flatbed scan platen 106 and the ADF step glass 114, attaches to the scanner base 102 thereby holding the flatbed scan platen 106 and the ADF step glass 114 in place. The flatbed scan platen 106 is fabricated from a transparent material, for example glass. The top surface of the flatbed scan platen forms a flatbed scan area. The ADF step glass is also formed from a transparent material, typically glass. The top portion of the ADF step glass forms an ADF scan area.

The calibration strip 122 is positioned on top of the ADF step glass 114 and the flatbed scan platen 106. The top bezel 104 covers the part of the calibration strip that is on top of the flatbed scan platen 106. The ADF exit ramp 120 covers the part of the calibration strip that is on top of the ADF step glass 114. ADF exit ramp 120 is fabricated from a flexible transparent material, for example Mylar. One end of the ADF exit ramp 120 may be captured between the top bezel and the scanner base 102, thereby holding the ADF exit ramp 120 in place. Scanner base 102 also supports a drive system (not shown for clarity) that moves the flatbed scan sensor 108 along the underside of the ADF step glass 114 and the flatbed scan platen 106. The flatbed scan sensor 108 is shown located at the ADF scan position. An ADF is positioned on the top side of scanner base 102 above the ADF step glass 114.

ADF comprises an ADF feed guide 112 and a duplex scan sensor 110. The ADF may also comprise a housing, an input tray, and output tray and a paper transport system containing motors, belts, paper picking mechanisms and the like, but these items are not shown for clarity. In some examples the ADF is integrated as part of the scanner, in other examples the ADF may be removably detachable and may be optional equipment for the scanner. The duplex scan sensor 110 is fixed in place in the ADF and is positioned above the section of the calibration strip 122 located on top of the ADF step glass 114. ADF exit ramp 120 is positioned on top of ADF step glass 114, part of the calibration strip 122 and the top bezel 104. ADF exit ramp 114 helps guide pages through the ADF paper path and into an output tray (not shown for clarity). A page 116 is shown in the ADF paper path. The paper feeding direction is shown by arrows 124. The ADF paper path goes from an input tray, around ADF feed guide 112, underneath the duplex scan sensor 110, up the ADF exit ramp 120 and into an output tray.

During an ADF scan the flatbed scan sensor 108 is positioned underneath the ADF step glass 114 (as shown). As the page moves through the ADF paper path the flatbed scan sensor 108 remains stationary and captures an image of the downward facing side of the page as it passes above the flatbed scan sensor 108. The duplex scan sensor 110 is fixed in place. The paper path travels between the duplex scan sensor and the ADF exit ramp 120. The duplex scan sensor 110 captures an image of the upward facing side of the page as it passes underneath the duplex scan sensor 110.

During a flatbed scan, the page would be placed onto the flatbed scan platen 106 and the flatbed scan sensor 108 would move along the length of the flatbed scan platen capturing an image of the downward facing side of the page. The duplex scan sensor 110 is not used during a flatbed scan.

Figure 2:
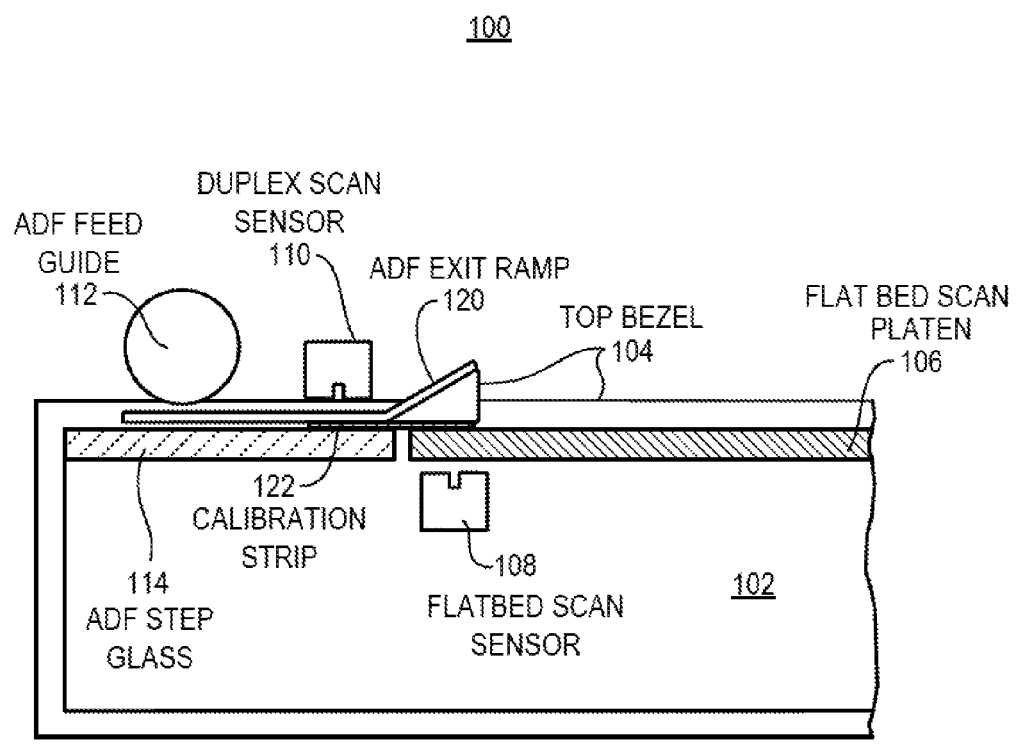
FIG. 2 is a cutaway side view of the example duplex scanner from FIG. 1.

Most scanners calibrate the scan sensors before scanning. Some scanners only do a calibration at power-on, some scanners calibrate before each multi-page scan job, and some scanners calibrate before each scan. For scanners that have a scan head fixed in place, the calibration position is the same as the scan position. For scanners that have a scan head that moves during a scan, the calibration position is typically different than the scan position. FIG. 2 is a cutaway side view of the example duplex scanner from FIG. 1.

In FIG. 2 the flatbed scan sensor 108 is shown located at the calibration position. In one example the flatbed calibration position is underneath the section of the calibration strip 122 located underneath the top bezel 104. An ADF is positioned on the top side of scanner base 102 above the ADF step glass 114. When there are no pages located in the ADF paper path (as shown), the duplex scan sensor can scan the top surface of the calibration strip 122 through the ADF exit ramp 120.

To calibrate the scanner, both the duplex scan sensor 110 and the flatbed scan sensor 108 may be calibrated. Calibrating a scan sensor typically involves scanning a calibration strip that runs along the length of the scan sensor. The calibration strip is typically a white strip that has a known reflectance and color. The calibration strip may be scanned twice, once with no light illuminating the calibration strip 122 (typically called a dark scan) and once with light illuminating the calibration strip 122. The data from the two scans is typically used to adjust a gain and offset for each pixel in the scan sensor.

When calibrating the duplex scan sensor, a scan with the duplex scan sensor is done without feeding a page through the ADF. Because the duplex scan sensor is fixed in position above the calibration strip, the duplex scan sensor can "see" the top of the calibration strip when there are no pages in the ADF paper path.

When calibrating the flatbed scan sensor, the flatbed scan sensor is moved to the flatbed calibration position (as shown in FIG. 2). In some examples the flatbed scan sensor may move during a calibration scan. This causes the flatbed scan sensor to sweep across a section of the calibration strip, minimizing the effect of dust located on the calibration strip. In other examples, the flatbed scan sensor may remain fixed in position during a calibration scan. Once the scan sensors are calibrated, the flatbed scan sensor is moved to the ADF scan location (shown in FIG. 1) and a page is fed through the ADF as the two scan sensors capture an image of the top and bottom of the page.

Figure 3A:
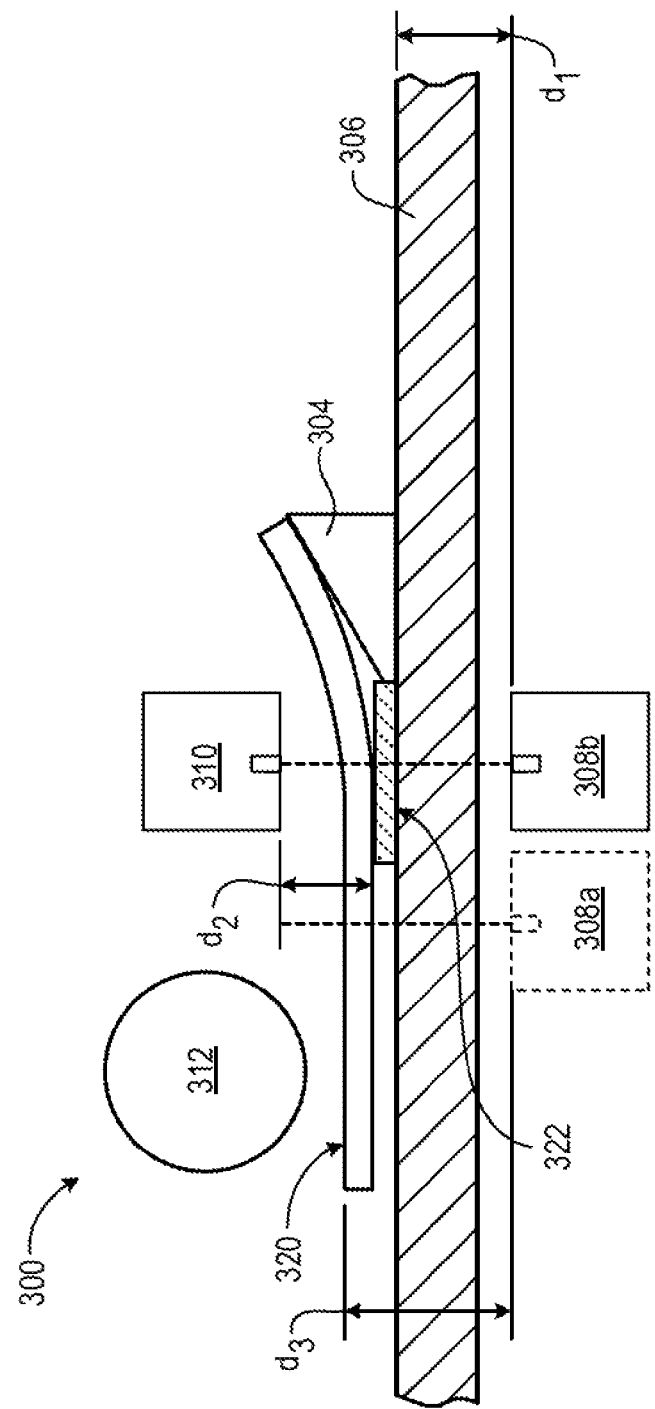
FIG. 3a is a close-up side view of an example scanner 300.

Scanner 100 is shown with a separate ADF step glass and a separate flatbed scan platen. In other examples a single piece of glass is used. FIG. 3a is a close-up side view of an example scanner 300. Scanner 300 comprises a single glass piece 306, a flatbed scan sensor (shown at 2 positions 308a and 308b), a top bezel 304, an ADF exit ramp 320, a calibration strip 322 and an ADF. The ADF comprises an ADF feed guide 312 and a duplex scan sensor 310. The ADF may also comprise a housing, an input tray, and output tray and a paper transport system containing motors, belts, paper picking mechanisms and the like, but these items are not shown for clarity.

The single glass piece 306 acts as both the ADF step glass and the flatbed scanning platen. One part of the top bezel 304 is located on top of the single glass piece 306 and divides the single glass piece 306 into a flatbed scanning area (on the right of the top bezel 304) and an ADF scanning area (on the left of the top bezel 304). The calibration strip 322 is located on the top surface of the single glass piece 306, adjacent to the top bezel 304 in the ADF scan area. The flatbed scan sensor 308 is movable along the bottom of the single glass piece 306.

The flatbed scan sensor 308 is shown in two different locations. The flatbed scan sensor 308b (solid line) is shown at the calibration location. The flatbed scan sensor 308a (dashed line) is shown at the ADF scan location. In the calibration location the flatbed scan sensor 308b (solid line) is underneath the calibration strip 322 and can scan the bottom surface of the calibration strip through the single glass piece 306. In the ADF scan location flatbed scan sensor 308a (dashed line) is off to the left side of the calibration strip 322 and can scan the bottom surface of a page through the single glass piece 306 and through the ADF exit ramp as the page is moved through the ADF.

During a calibration scan, the distance between the flatbed scan sensor and the bottom surface of the calibration strip 322 is distance d1. The distance between the scan sensor and the calibration strip is known as the calibration distance. Therefore distance d1 is the flatbed calibration distance. When a flatbed scan is done the page is placed face down on the top surface of the single glass piece 306. Therefore the distance between the flatbed scan sensor and the bottom of the page is also distance d1. The distance between the scan sensor and the surface of the scanned page is known as the scan distance. Therefore distance d1 is also the flatbed scan distance. During an ADF scan the flatbed scan sensor scans the bottom surface of the page as it rides on top of ADF exit ramp 320. Therefore the distance between the bottom surface of the page in the ADF paper path (see FIG. 3b) and the flatbed scan sensor is distance d3. Distance d3 is the ADF scan distance for the flatbed scan sensor.

Figure 3B:
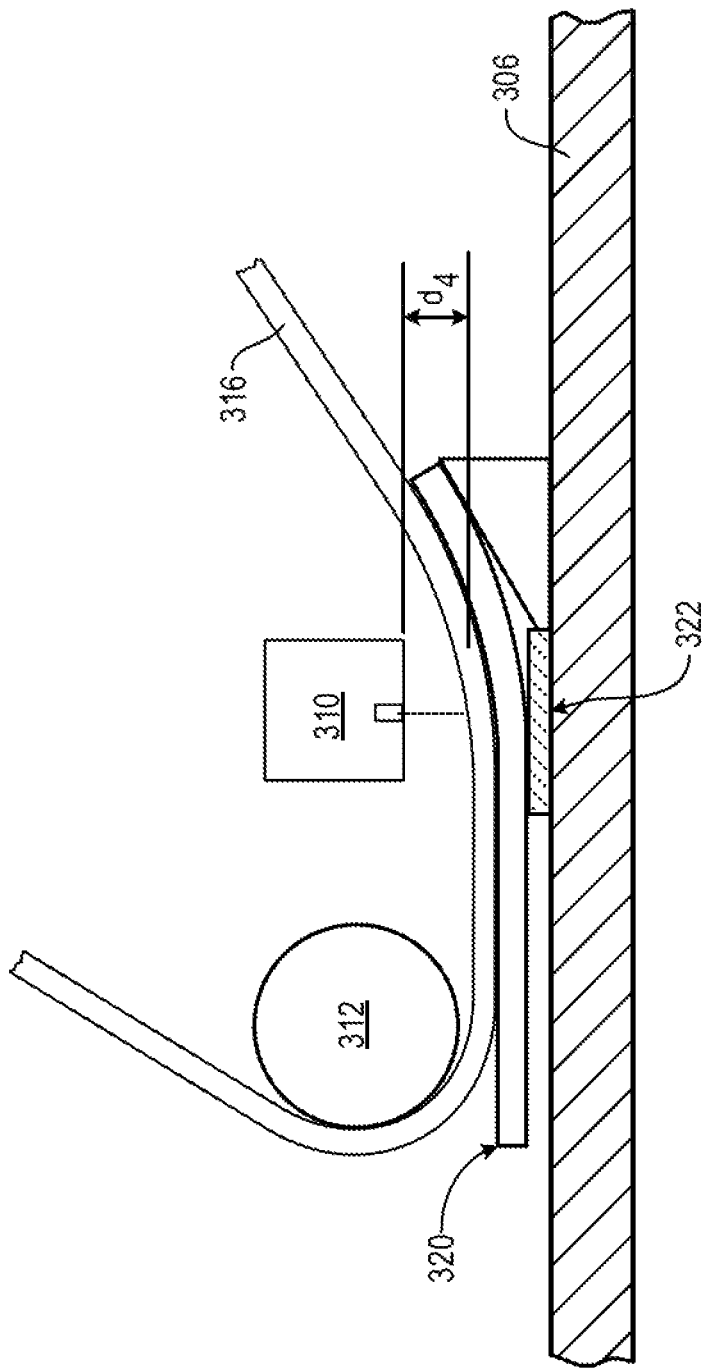
FIG. 3b is the example scanner 300 from FIG. 3a with a page 316 in the automatic document feeder (ADF).

The duplex scan sensor in the ADF is fixed in position and located above the calibration strip. During a calibration scan, the duplex scan sensor scans the top surface of the calibration strip. The distance between the duplex scan sensor 310 and the top surface of the calibration strip is distance d2. Therefore distance d2 is the duplex scan sensor calibration distance. FIG. 3b is the example scanner 300 from FIG. 3a with a page 316 in the ADF. During an ADF scan, the duplex scan sensor 310 scans the top side of the page 316 as it moves through the ADF, while the page rides on top of ADF exit ramp 320. The distance between the duplex scan sensor 310 and the top surface of the page is distance d4. Distance d4 is the ADF scan distance for the duplex scan sensor.

In one example the duplex scan sensor uses a contact image sensor (CIS). Contact image sensors have a limited depth of field. CIS sensors also have a limited depth of illumination due to the directional nature of the light source used in most CIS sensors. In addition the intensity of the light used to illuminate the area being scanned drops off as a cube ($x^3$) of the distance between the light and the area being scanned. Therefore when the calibration distance is different than the scan distance, the quality of the calibration may degrade. The larger the difference in distances, the less accurate the calibration becomes.

In some examples the flatbed scan sensor may also use a CIS. In other examples the flatbed scan sensor may use a folded optical system, or other types of optical systems. Folded optical systems typically have a much larger depth of field as compared to a CIS. In addition folded optical systems typically use a broadband light source that produces a greater depth of illumination. Because of these differences, a folded optical system is typically less sensitive to differences between the calibration distance and the scan distance.

Many current duplex scanners use two calibration strips, one for the flatbed scan sensor and one for the duplex scan sensor. The duplex calibration strip is typically located on the bottom side on the ADF step glass. This means that the calibration distance includes the thickness of the ADF step glass. Therefore there is a large difference between the ADF scan distance and the calibration distance for the duplex scan sensor. In contrast, the example scanners describe above do not include the ADF step glass thickness in the calibration distance for the duplex scan sensor.

In some examples, the ADF step glass has a thickness of about 2.85 mm. The ADF exit ramp has a thickness of about 0.13 mm, and a typical page to be scanned has a thickness of about 0.10 mm. In some examples the calibration strip may be formed as a molded piece of plastic having a thickness of about 0.34 mm. In other examples the calibration strip may be stamped out of an opaque piece of Mylar having a thickness of about 0.1 mm. In yet other examples the calibration strip may be a pre-printed label, or may be printer or painted onto the top surface of the ADF step glass or the bottom surface of the ADF exit ramp.

Because scanner's 100 and 300 (from FIGS. 1 and 3) have the single calibration strip on the top side of the ADF step glass, the calibration distance for the duplex scan sensor does not include the thickness of the ADF step glass. Therefore the calibration distance is only different from the ADF scan distance by the thickness of the ADF exit ramp and the page thickness, which is typically only about 0.23 mm.

The calibration distance of the flatbed scan sensor and the ADF scan distance of the flatbed scan sensor is different by the thickness of the calibration strip and the ADF exit ramp. The thickness of the calibration strip varies between 0.1 mm and 0.34 mm and the thickness of the ADF exit ramp is about 0.13 mm. Therefore the difference between the flatbed scan sensor calibration distance and the flatbed scan sensor ADF scan distance is between 0.23 mm and 0.47 mm.

Figure 4:
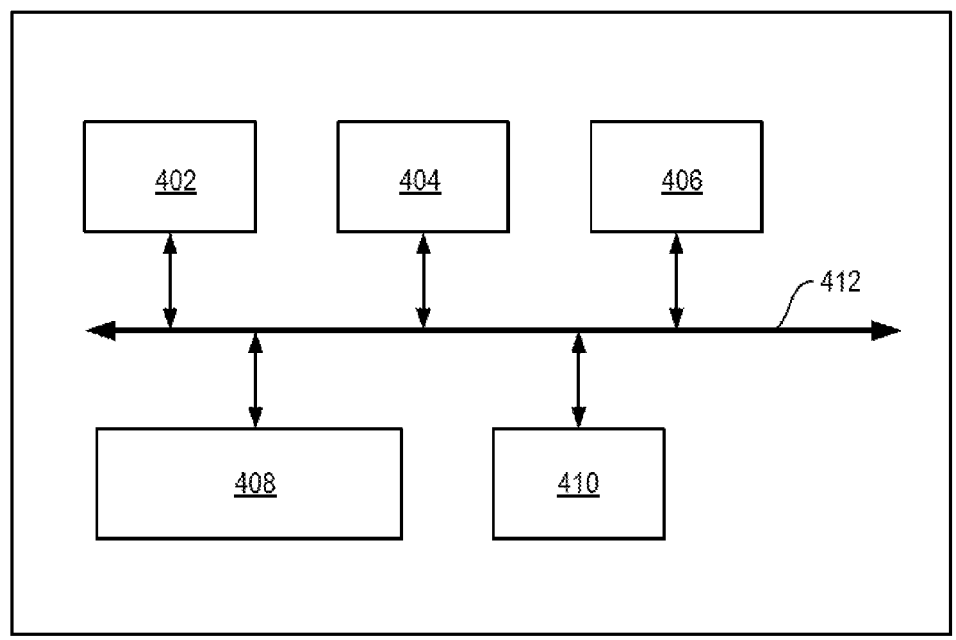
FIG. 4 is an example block diagram of a scanner.

FIG. 4 is an example block diagram of a scanner. Scanner comprises a processor 402, memory 404, input/output (I/O) module 406, display 408 and controller 410 all coupled together on bus 412. In some examples scanner may also have a user interface module, an input device, and the like, but these items are not shown for clarity. Processor 402 may comprise a central processing unit (CPU), a micro-processor, an application specific integrated circuit (ASIC), or a combination of these devices. Memory 404 may comprise volatile memory, non-volatile memory, and a storage device. Memory 404 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 406 is used to couple scanner to other devices, for example the Internet or a computer. Scanner has code, typically called software, stored in the memory 404. The software is stored as computer readable instructions in the non-transitory computer readable medium (i.e. the memory 404). Processor 402 generally retrieves and executes the instructions stored in the non-transitory computer-readable medium to operate the scanner and to execute functions. In one example, processor executes code that calibrates the scanner.

Figure 5:
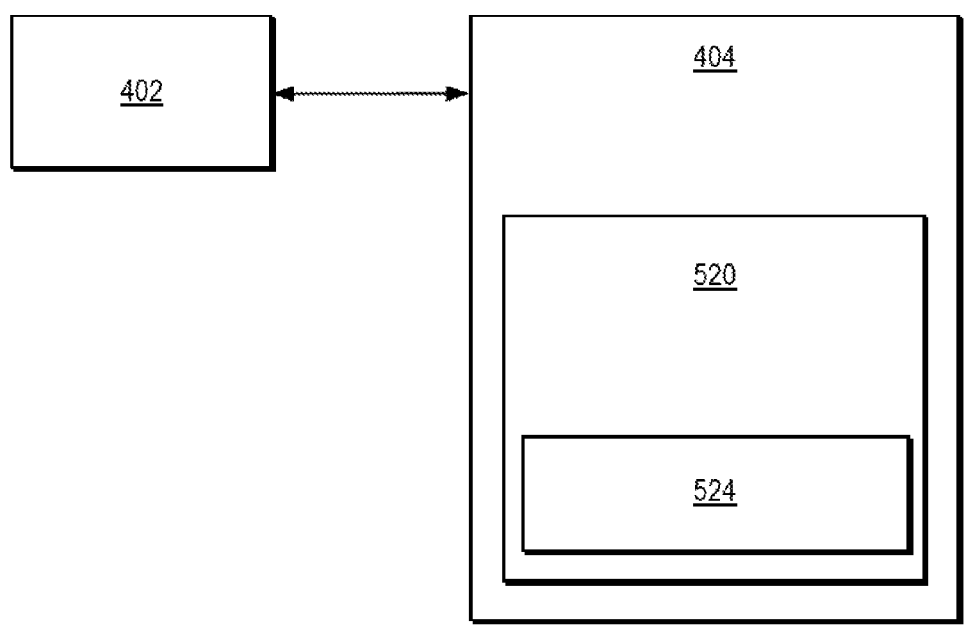
FIG. 5 is an example block diagram of the processor 402 coupled to memory 404.
Figure 6:
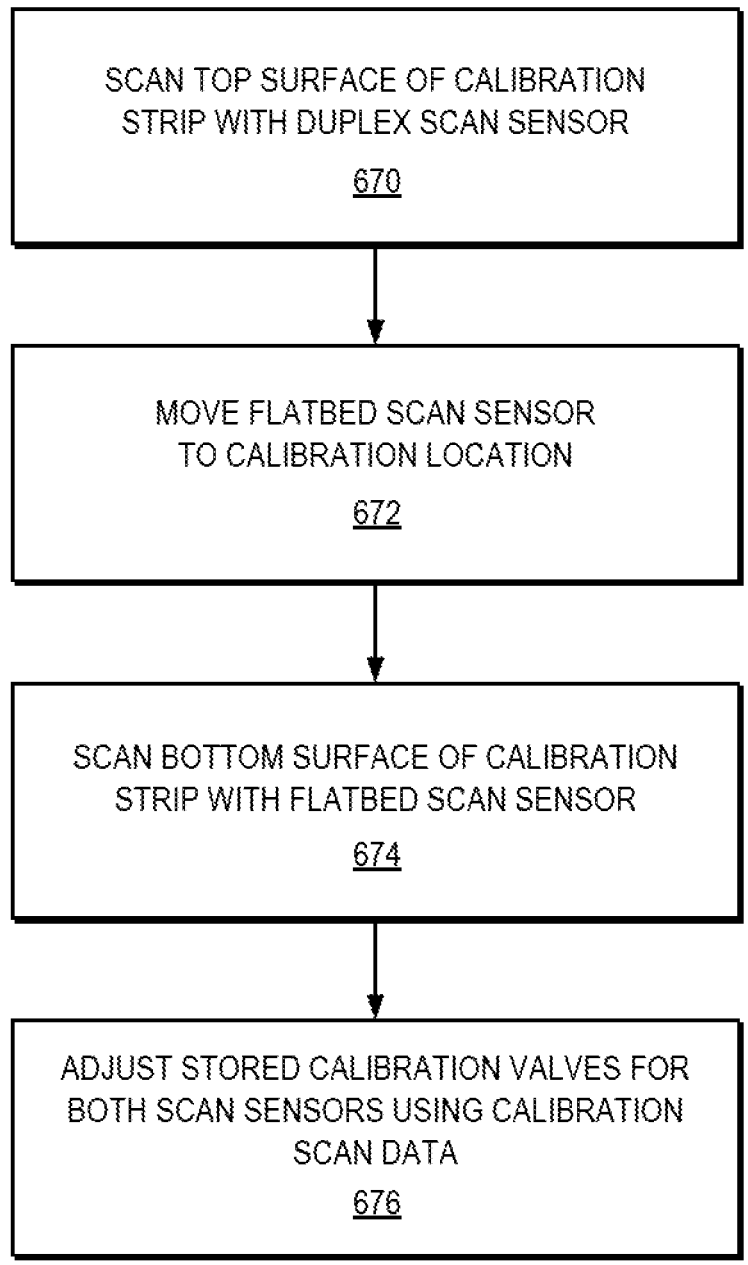
FIG. 6 is an example flow chart for calibrating a duplex scanner having only one calibration strip.

FIG. 5 is an example block diagram of the processor 402 coupled to memory 404. Memory 404 contains software 520. Software 520 contains a calibration module 524. The processor 402 executes the code in calibration module 524 to calibrate the scanner. FIG. 6 is an example flow chart for calibrating a duplex scanner having only one calibration strip. At block 670 the duplex scan sensor scans the top side of the single calibration strip. Flow continues at block 672. At block 672 the flatbed scan sensor is moved to the calibration location. Flow continues at block 674. At block 674 the flatbed scan sensor scans the bottom side of the single calibration strip. Flow continues at block 676. At block 676 the data from the duplex scans and flatbed scans is used to adjust the stored calibration values for the two scan sensors.

The scanners described above may be integrated into a multifunction peripheral (MFP). A multifunction peripheral (MFP) is a device that typically contains a printer and an imaging system, typically a scanner. The MFP can be used as a printer, a scanner, a copier, a facsimile machine (FAX) or the like. MFPs are also called all-in-one devices (AiO), multifunction devices, multifunction printers or the like.

What is claimed is:

1. A scanner, comprising:
   a calibration strip having a top surface and a bottom surface;
   an automatic document feeder (ADF) step glass having a top surface, the calibration strip coupled to the top surface of the ADF step glass in an ADF scan area;
   a duplex scan sensor fixed in position in an ADF, the ADF coupled to the scanner such that the duplex scan sensor is located above, and can view, the calibration strip, where the top surface of the calibration strip is used to calibrate the duplex scan sensor;
   a flatbed scan sensor movably positioned along a bottom surface of the ADF step glass, where the flatbed scan sensor can view the bottom surface of the calibration strip when the flatbed scan sensor is located in a calibration position, where the bottom surface of the calibration strip is used to calibrate the flatbed scan sensor;
   wherein the duplex scan sensor has a calibration distance and a scan distance and where the scan distance is shorter than the calibration distance by 0.4 mm or less.

2. The scanner of claim 1, further comprising:
   a single glass piece having a top surface wherein one section of the single glass piece acts as the ADF step glass;
   a top bezel coupled to the top surface of the single glass piece, at least one section of the top bezel dividing the top surface of the single glass piece into the ADF scan area and a flatbed scan area, where the calibration strip is positioned on the top surface of the single glass piece adjacent to the at least one section of the top bezel.

3. The scanner of claim 1, wherein the calibration strip is fabricated from either a molded plastic strip or a stamped plastic sheet.

4. The scanner of claim 1, further comprising:
   an ADF exit ramp fabricated from a transparent material, where a first section of the ADF exit ramp is positioned on top of the calibration strip and a second section of the ADF exit ramp is positioned on top of at least one section of a top bezel.

5. The scanner of claim 4, wherein the calibration strip is coupled to a bottom side of the ADF exit ramp.

6. The scanner of claim 1, further comprising:
   a flatbed scan platen adjacent to the ADF step glass where the calibration strip is coupled to both the top surface of the ADF step glass and a top surface of the flatbed scan platen.

7. The scanner of claim 1, wherein the ADF is removably detachable from the scanner.

8. A scanner, comprising,
   a calibration strip having a top surface and a bottom surface;
   an automatic document feeder (ADF) step glass having a top surface, the calibration strip coupled to the top surface of the ADF step glass in an ADF scan area;
   a duplex scan sensor fixed in position in an ADF, the ADF coupled to the scanner such that the duplex scan sensor is located above, and can view, the calibration strip, where the top surface of the calibration strip is used to calibrate the duplex scan sensor;
   a flatbed scan sensor movably positioned along a bottom surface of the ADF step glass, where the flatbed scan sensor can view the bottom surface of the calibration strip when the flatbed scan sensor is located in a calibration position, where the bottom surface of the calibration strip is used to calibrate the flatbed scan sensor;

wherein the flatbed scan sensor has a calibration distance and an ADF scan distance and where the ADF scan distance is longer than the calibration distance by 0.6 mm or less.

9. The scanner of claim 1, wherein the flatbed scan sensor has a flatbed scan distance and where the flatbed scan distance is equal to the flatbed scan sensor calibration distance.

10. The scanner of claim 1, wherein the duplex scan sensor uses a contact image sensor (CIS).

11. The scanner of claim 1, wherein the flatbed scan sensor does not uses a contact image sensor (CIS).

12. The scanner of claim 1, wherein the scanner is part of a multifunction peripheral (MFP).

13. A method of calibrating a duplex scanner, comprising:
scanning a top surface of a single calibration strip with a duplex scan sensor to produce duplex calibration data;
scanning a bottom surface of the single calibration strip with a flatbed scan sensor to create flatbed calibration data;
adjusting stored calibration values for the duplex scan sensor and the flatbed scan sensor using the duplex scan data and the flatbed scan data respectively;
wherein the duplex scan sensor has a calibration distance and a scan distance and where the scan distance is shorter than the calibration distance by 0.4 mm or less.

14. The scanner of claim 13, wherein the duplex scan sensor uses a contact image sensor (CIS).

\* \* \* \* \*